United States Patent [19]

Sato

[11] Patent Number: 5,995,600
[45] Date of Patent: Nov. 30, 1999

[54] TRANSMITTING METHOD IN FACSIMILE

[75] Inventor: Masaru Sato, Osaka, Japan

[73] Assignee: Mita Industrial Co., Ltd., Osaka, Japan

[21] Appl. No.: 09/005,843

[22] Filed: Jan. 12, 1998

[30]     Foreign Application Priority Data

Jan. 17, 1997  [JP]  Japan ................................... 9-006931

[51] Int. Cl.⁶ ................................................. H04M 11/00
[52] U.S. Cl. ................................... 379/100.14; 358/435
[58] Field of Search ..................... 379/100.01, 100.06,
379/100.12–100.17, 93.08, 93.26–93.34;
358/434–440, 442, 468, 405, 406

[56]           References Cited

U.S. PATENT DOCUMENTS 5,790,266   8/1998   Nakamura et al. ................... 379/93.31

FOREIGN PATENT DOCUMENTS 6-339002  12/1994  Japan .................................. 379/93.31

Primary Examiner—Wing F. Chan
Attorney, Agent, or Firm—Smith, Gambrell & Russell

[57]           ABSTRACT

When a calling facsimile receives a second control signal, the calling facsimile compares second information relating to the capabilities of a called facsimile and first information relating to the capabilities of the called facsimile which is stored in storage means on the basis of the second control signal. When the capabilities of the called facsimile are changed, the first information relating to the capabilities of the called facsimile which is stored in the storage means is updated, and a third control signal composed of a tone signal indicating that a facsimile message should be sent to the called facsimile is sent out to the called facsimile.

8 Claims, 5 Drawing Sheets

TRANSMITTING METHOD IN FACSIMILE

BACKGROUND OF THE INVENTION

1. Field of the Invention

The present invention relates to a transmitting method in a facsimile.

2. Description of the Prior Art

FIG. 5 shows a conventional facsimile communication procedure.

When a called facsimile is connected to a network by calling the called facsimile from a calling facsimile, the called facsimile sends out a non-standard facilities (NSF) signal, a called subscriber identification (CSI) signal and a digital identification signal (DIS).

The calling facsimile receives the above-mentioned signals, and then sends out a transmitting subscriber identification (TSI) signal and a digital command signal (DCS). Further, the calling facsimile then sends out a training signal and a training check (TCF) signal.

The called facsimile sends out a confirmation-to-receive (CFR) signal when the adjustment of a high speed modem is completed. The calling facsimile sends out a coded facsimile message subsequently to the training signal when it receives the confirmation-to-receive (CFR) signal.

The calling facsimile sends out an end-of-procedures (EOP) signal when it sends out all facsimile messages. The called facsimile sends out a message confirmation (MCF) signal when it receives the end-of-procedures (EOP) signal. The calling facsimile sends out a disconnect (DCN) signal when it receives the message confirmation (MCF) signal.

Time required for communication in the facsimile is broadly divided into time required for image transmission and time required for a transmission control procedure. The time required for image transmission is significantly shortened by realizing coding at a high compression rate and increase in the transmission rate, so that an image on one standard original of A4 size can be transmitted in six seconds. On the other hand, the time required for a transmission control procedure follows the procedure of T.30 of ITU-T (International Telecommunication Union-Telecommunication Standardization Sector). If procedures before and after the communication are added thereto, therefore, it takes approximately 15 to 30 seconds.

SUMMARY OF THE INVENTION

An object of the present invention is to provide a transmitting method in a facsimile in which time required for a transmission control procedure can be shortened, and a facsimile message corresponding to the capabilities of a called facsimile such as the size of paper on which printing can be done and the resolution can be transmitted even when the capabilities of the called facsimile are changed.

A transmitting method in a facsimile according to the present invention is characterized by comprising a first step of a calling facsimile comprising storage means storing, in a case where facsimile communication is established through a normal transmission procedure between the calling facsimile and a called facsimile, first information relating to the dial number of the called facsimile and the capabilities of the called facsimile in the storage means when the facsimile communication is established at the highest transmission rate of the called facsimile, a second step of the calling facsimile sending out, when the calling facsimile calls the called facsimile whose dial number is stored in the storage means, a first control signal composed of a tone signal indicating that facsimile transmission should be made through a particular procedure to the called facsimile, a third step of the called facsimile sending out, when the called facsimile receives the first control signal, a second control signal composed of a tone signal for transmitting second information relating to the capabilities of the called facsimile to the calling facsimile, a fourth step of the calling facsimile comparing, when the calling facsimile receives the second control signal, the second information relating to the capabilities of the called facsimile and the first information relating to the capabilities of the called facsimile which is stored in the storage means on the basis of the second control signal, and updating the first information relating to the capabilities of the called facsimile which is stored in the storage means as well as sending out to the called facsimile a third control signal composed of a tone signal indicating that a facsimile message should be sent to the called facsimile when the capabilities of the called facsimile are changed, and a fifth step of determining a transmission mode on the basis of the first information relating to the capabilities of the called facsimile which is stored in the storage means, sending out the third control signal, and then sending out the facsimile message to the called facsimile.

According to the present invention, time required for a transmission control procedure can be shortened. Further, even when the capabilities of the called facsimile such as the size of paper on which printing can be done and the resolution are changed, the facsimile message corresponding to the capabilities of the called facsimile can be transmitted.

The first information and the second information relating to the capabilities of the called facsimile respectively include information representing the size of paper on which printing can be done and information representing the resolution. An example of the second control signal composed of a tone signal for transmitting the second information relating to the capabilities of the called facsimile to the calling facsimile is a tone signal representing the type of the capabilities of the called facsimile depending on its frequency. In sending out the facsimile message to the called facsimile, it is preferable that information representing the resolution of the facsimile message to be actually transmitted and information representing the size of paper on which the facsimile message should be printed are also sent out.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
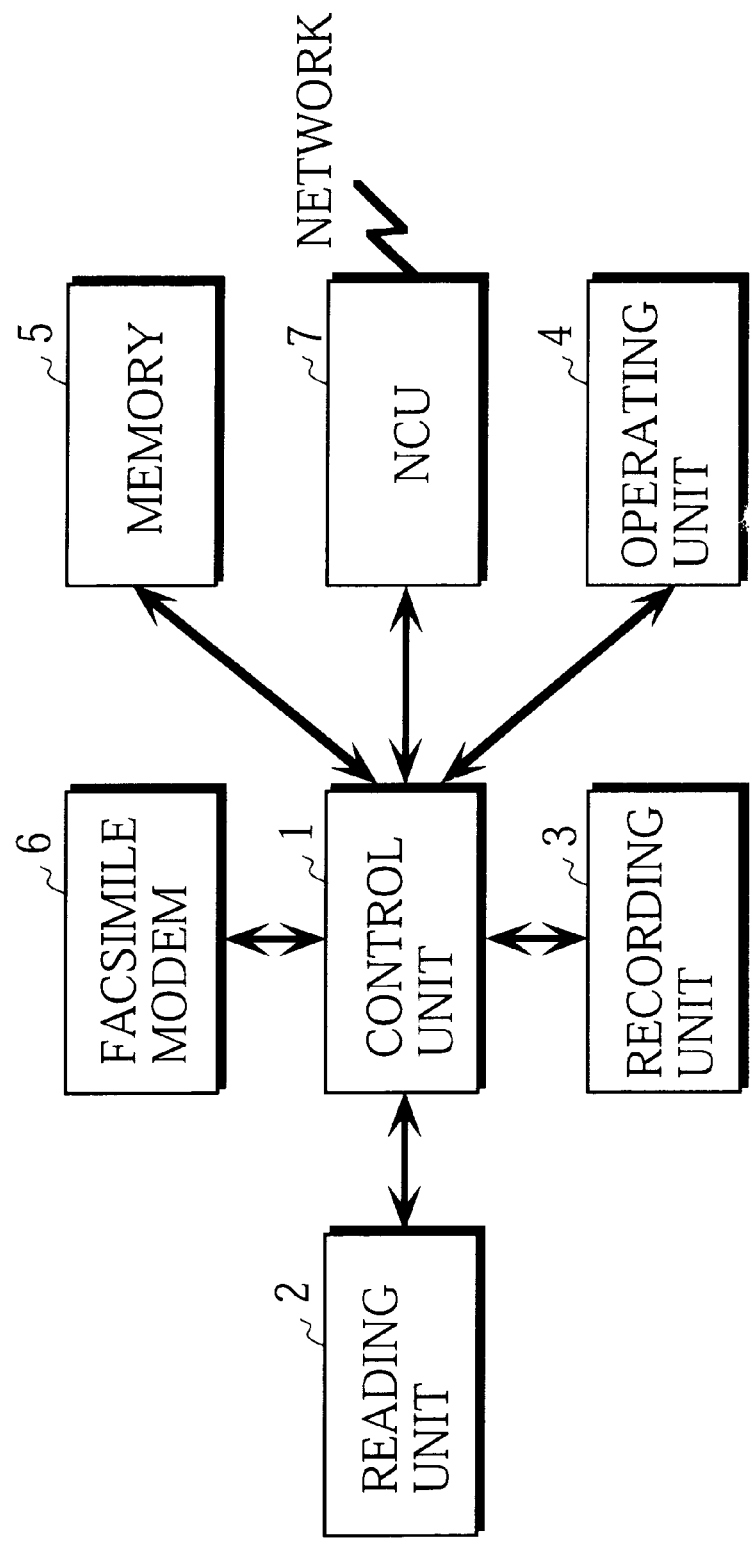
FIG. 1 is an electrical block diagram showing the schematic construction of a facsimile.

Referring now to the drawings, embodiments of the present invention will be described.

FIG. 1 illustrates the schematic construction of a facsimile.

The facsimile is controlled by a control unit 1 which is constituted by a microcomputer and the like. The facsimile comprises as an input-output device of the control unit 1 a reading unit 2 for reading an original image, a recording unit 3 for recording a received image on paper, an operating unit 4 for performing a dial input operation including one-touch dialing and abbreviated dialing, a memory 5 storing various types of information, a facsimile modem 6 comprising a programmable tone sending and detecting function, and a network control unit (NCU) 7 for controlling a network.

Figure 2:
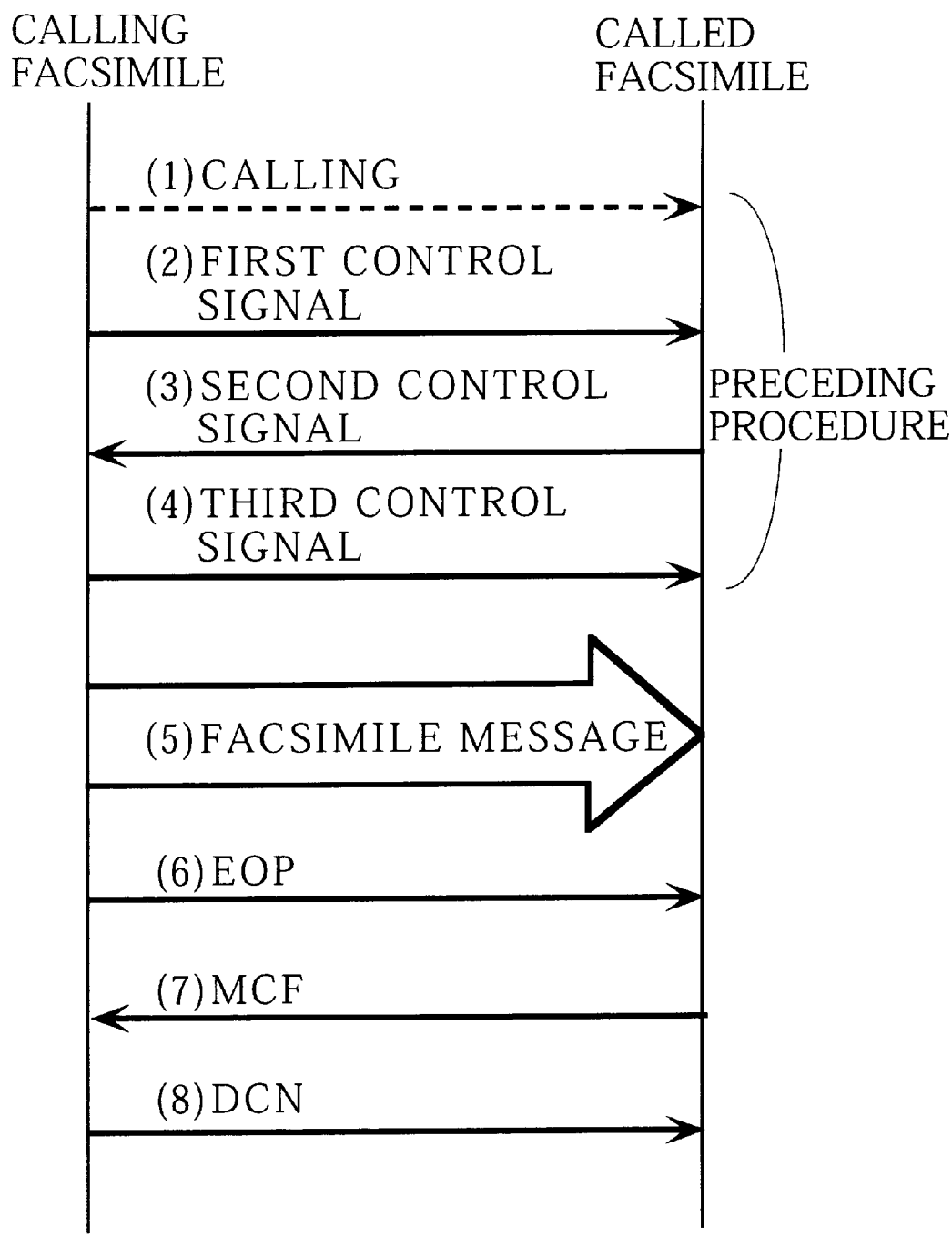
FIG. 2 is a sequence chart showing a transmission procedure in the facsimile.

FIG. 2 shows a transmission procedure between two facsimiles of the above-mentioned construction. A number enclosed in parentheses in FIG. 2 is a sequence number.

FIG. 2 shows a transmission procedure in a case where in facsimile communication of a normal type, a calling facsimile makes a facsimile transmission to a called facsimile which can, in some cases, establish facsimile communication at the highest transmission rate of the called facsimile.

When in the above-mentioned facsimile communication of a normal type, the facsimile communication is established at the highest transmission rate of the called facsimile, the calling facsimile stores information relating to the called facsimile in the memory 5 on the basis of a digital identification signal (DIS) received from the called facsimile. The information relating to the called facsimile includes the dial number of the called facsimile, information relating to the capabilities of the called facsimile (for example, the size of paper on which printing can be done, the resolution, and the transmission rate).

The called facsimile is called from the calling facsimile (sequence NO.1), and a tone signal (a first control signal) indicating that communication should be established through a tone procedure is transmitted to the called facsimile (sequence NO.2).

When the network is connected, so that the called facsimile receives the first control signal, the called facsimile sends out a tone signal (a second control signal) for transmitting information relating to the current capabilities of the called facsimile (sequence NO. 3).

Information relating to the capabilities of the called facsimile which is transmitted by the second control signal includes the size of paper on which printing can be done and the resolution. The capabilities are represented by the frequency of the second control signal. The relationship between the second control signal and the capabilities of the called facsimile is set as follows, for example:

(1) The relationship between the size of the paper and the frequency of the second control signal
 (a) in a case where printing can be done on paper of A3/B4/A4 size a second control signal having a frequency of 600 Hz
 (b) in a case where printing can be done on paper of B4/A4 size a second control signal having a frequency of 700 Hz
 (c) in a case where printing can be done on paper of A4 size a second control signal having a frequency of 800 Hz (2) The relationship between the resolution and the frequency of the second control signal
 (a) in a case where the resolution is in a normal mode a second control signal having a frequency of 900 Hz
 (b) in a case where the resolution is in a fine mode a second control signal having a frequency of 1000 Hz
 (c) in a case where the resolution is in a superfine mode a second control signal having a frequency of 1100 Hz
 (d) in a case where the resolution is in a ultrafine mode a second control signal having a frequency of 1200 Hz The resolution in the normal mode, the resolution in the fine mode, the resolution in the superfine mode, and the resolution in the ultrafine mode shall be increased in this order.

When the capabilities of the called facsimile, that is, the size of the paper and the resolution are transmitted, a second control signal in which two types of tone signals respectively having frequencies are overlapped with each other is transmitted. For example, when the called facsimile has the capability to do printing on the paper of A3/B4/A4 size and has the capability to do printing in the superfine mode, a second control signal in which a tone signal having a frequency of 600 Hz and a tone signal having a frequency of 1100 Hz are overlapped with each other is transmitted.

The calling facsimile receives, when it receives the second control signal, compares the information relating to the called facsimile which is stored in the memory 5 and the contents of the second control signal, and updates the contents of the memory 5 when the capabilities of the called facsimile are changed.

A transmission mode corresponding to the capabilities of the called facsimile is determined on the basis of the contents of the memory 5, to send out a tone signal (a third control signal) indicating that a facsimile message should be sent (sequence NO.4).

Thereafter, a facsimile message such as image data, together with the contents of a digital command signal (DCS) such as the resolution of an image to be actually transmitted and the size of paper on which printing should be done is sent out (sequence NO.5).

The calling facsimile sends out an end-of-procedures (EOP) signal when it sends out all facsimile messages (sequence NO.6). The called facsimile sends out a message confirmation (MCF) signal when it receives the end-of-procedures (EOP) signal (sequence NO.7). The calling facsimile sends out a disconnect (DCN) signal when it receives the message confirmation (MCF) signal (sequence NO.8).

Figure 3:
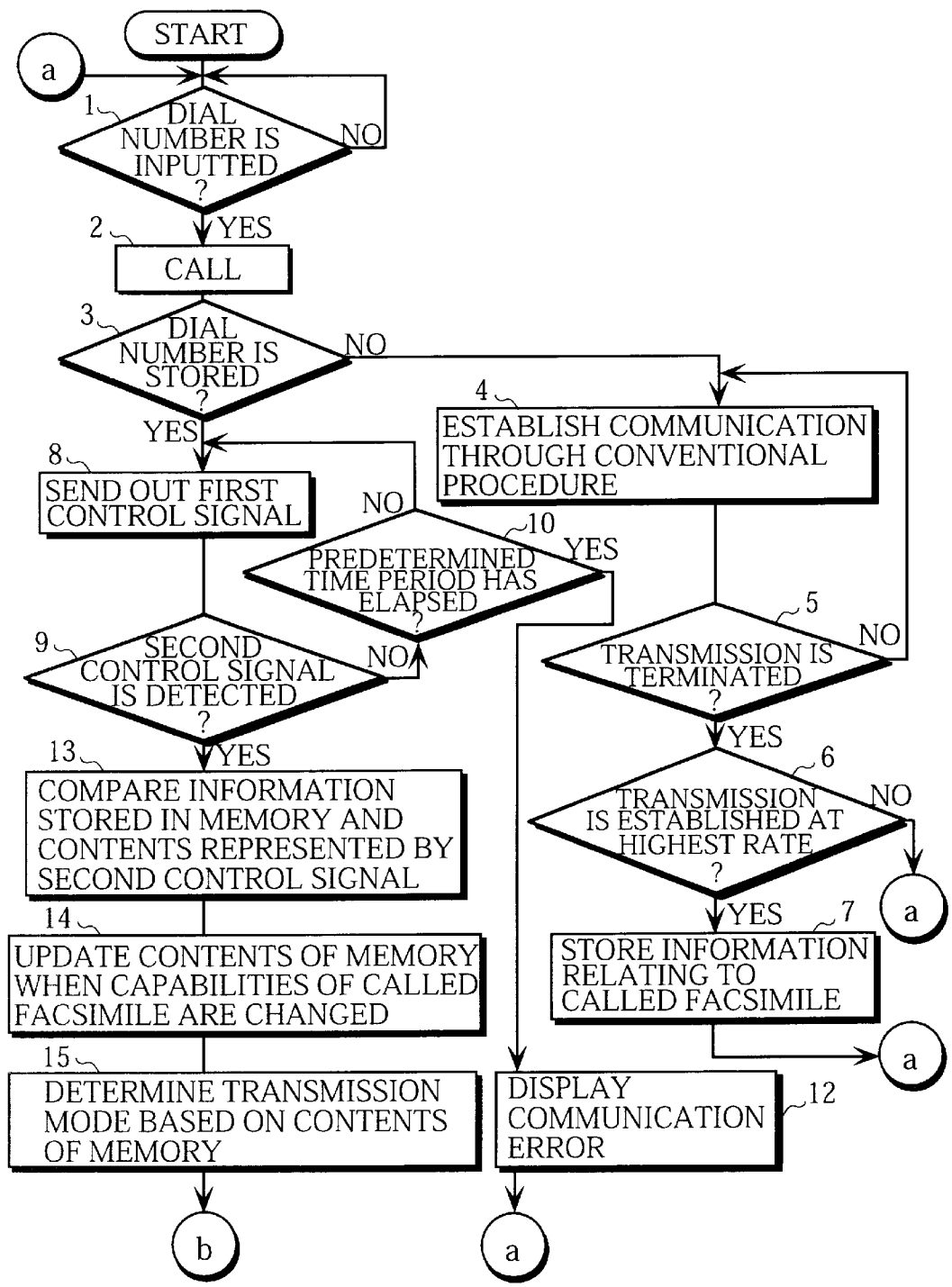
FIG. 3 is a flow chart showing a part of a transmission processing procedure carried out by a control unit 1 in a calling facsimile.
Figure 4:
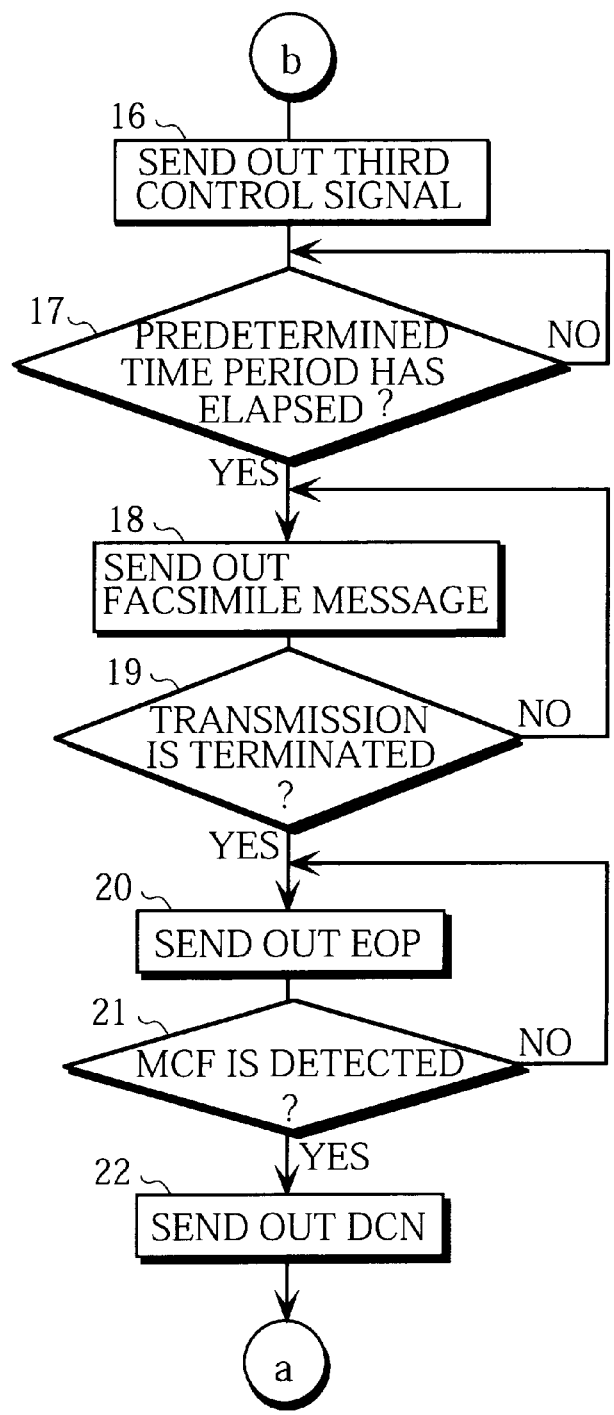
FIG. 4 is a flow chart showing another part of the transmission processing procedure carried out by the control unit 1 in the calling facsimile.

FIGS. 3 and 4 show a transmission processing procedure carried out by the control unit 1 in the calling facsimile.

If facsimile communication is established using a particular procedure according to the present embodiment, the transmission rate is not checked between the calling facsimile and the called facsimile, as apparent from the transmission procedure shown in FIG. 2. When a certain facsimile is first called, therefore, facsimile communication is established in accordance with the conventional system. If facsimile communication is established at the highest transmission rate of the called facsimile, information relating to the called facsimile is stored in the memory 5 on the basis of a digital identification signal (DIS) from the called facsimile.

When the facsimile whose dial number is stored in the memory 5 is called, facsimile communication using the particular procedure according to the present embodiment is established.

The transmission processing procedure carried out by the control unit 1 in the calling facsimile will be described in detail.

When a dial number is inputted from the operating unit 4 (step 1), a call is issued (step 2). Further, it is judged whether or not the inputted dial number is stored in the memory 5 (step 3).

Figure 5:
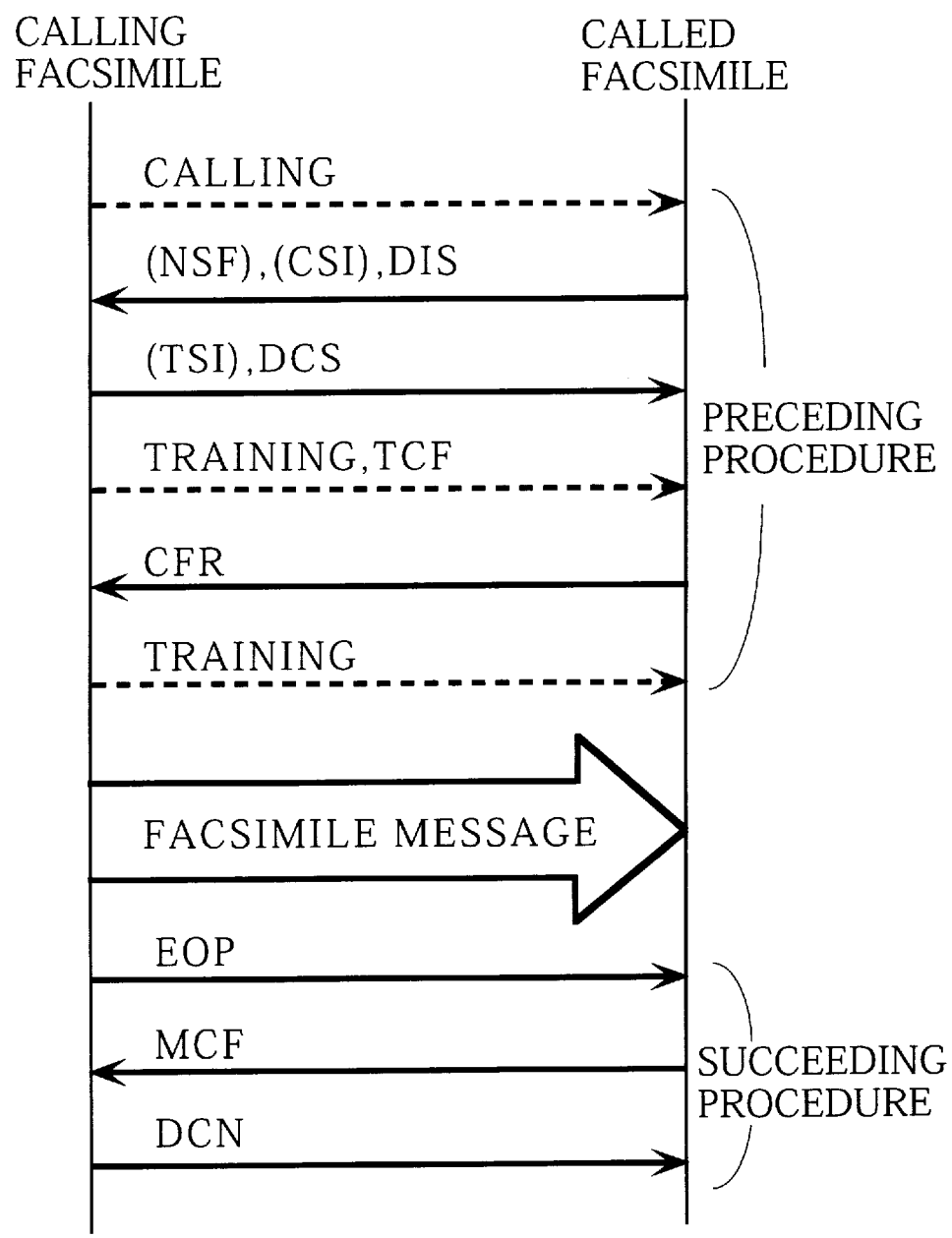
FIG. 5 is a sequence chart showing a transmission control procedure in a conventional facsimile.

When the dial number is not stored in the memory 5, facsimile communication is established through the conventional transmission control procedure (see FIG. 5) (step 4). When the facsimile communication is terminated (step 5), it is judged whether or not the facsimile communication is established at the highest transmission rate of the called facsimile (step 6). This judgment is made on the basis of the results of a training check in the preceding procedure.

When the facsimile communication is not established at the highest transmission rate of the called facsimile, the program is returned to the step 1. In the step 1, a dial input waiting state occurs. When the facsimile communication can be established at the highest transmission rate of the called facsimile, information relating to the called facsimile (for example, information relating to the dial number of the called facsimile and the capabilities of the called facsimile) is stored in the memory 5 (step 7), after which the program is returned to the step 1. In the step 1, a dial input waiting state occurs.

When it is judged in the foregoing step 3 that the dial number is stored in the memory 5, a tone signal (a first control signal) indicating that communication should be established through a tone procedure is sent out for a predetermined time period (for example, 500 msec) (step 8). The called facsimile sends out a tone signal (a second control signal) representing information relating to the capabilities of the called facsimile for a predetermined time period (for example, 600 msec) when it receives the first control signal.

When the tone signal (the second control signal) for transmitting the information relating to the capabilities of the called facsimile is not detected within a predetermined time period (for example, 1 sec) after the first control signal is sent out in the foregoing step 8 (step 9), the program is returned to the step 8 again. In the step 8, the first control signal is sent out for a predetermined time period. Even if the first control signal is repeatedly sent out, when the second control signal is not detected until a predetermined time period (for example, 3 sec) has elapsed since the first control signal was first sent out in the foregoing step 8 (YES in step 10), it is indicated on a display provided in the operating unit 4 that a communication error occurs (step 12), after which the program proceeds to the step 1. In the step 1, a dial input waiting state occurs.

When the second control signal is detected in the foregoing step 9, the information relating to the called facsimile which is stored in the memory 5 and the contents represented by the second control signal are compared with each other (step 13). When the capabilities of the called facsimile are changed, the contents of the memory 5 are updated (step 14).

A transmission mode corresponding to the capabilities of the called facsimile is determined on the basis of the contents of the memory 5 (step 15), and a tone signal (a third control signal) indicating that a facsimile message should be sent is sent out for a predetermined time period (for example, 200 msec) (step 16).

When a predetermined time period (for example, 200 msec) has elapsed since the third control signal was sent out (step 17), the facsimile message, together with the contents of the digital command signal (DCS) such as the resolution of an image to be actually transmitted and the size of paper, is sent out (step 18).

When all the facsimile messages are sent out (step 19), an end-of-procedures (EOP) signal is sent out (step 20). The called facsimile sends out, when it receives the end-of-procedures (EOP) signal, a message confirmation (MCF) signal. When the message confirmation (MCF) signal is received (step 21), a disconnect (DCN) signal is sent out (step 22), after which the program proceeds to the step 1. In the step 1, a dial input waiting state occurs.

According to the above-mentioned embodiment, the preceding procedure of the facsimile transmission control procedure is carried out by three control signals each composed of a tone signal, whereby time required for the facsimile transmission control procedure can be shortened. Further, the tone signal (the second control signal) for transmitting information relating to the capabilities of the called facsimile is sent to the calling facsimile, and the calling facsimile can update the information relating to the capabilities of the called facsimile which is stored in the memory 5 on the basis of the second control signal. Even when the capabilities of the called facsimile are changed, therefore, the facsimile message corresponding to the capabilities of the called facsimile can be transmitted.

Although in the above-mentioned embodiment, the tone signal (the second control signal) for transmitting the information relating to the capabilities of the called facsimile is a tone signal representing the type of capabilities of the called facsimile depending on its frequency, a tone signal representing the type of capabilities of the called facsimile depending on the length of a stop period of the tone signal may be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transmitting method in a facsimile, comprising:

a first step of calling a called facsimile with a calling facsimile that comprises storage means for storing, in a case where facsimile communication is established through a normal transmission procedure between the calling facsimile and a called facsimile, first information relating to the dial number of the called facsimile and capabilities of the called facsimile when the facsimile communication is established at a highest transmission rate of the called facsimile;

a second step of sending out from the calling facsimile, when the calling facsimile calls the called facsimile whose dial number is stored in said storage means, a first control signal composed of a tone signal indicating that facsimile transmission should be made through a particular procedure to the called facsimile;

a third step of sending out from the called facsimile, when the called facsimile receives the first control signal, a second control signal composed of a tone signal for transmitting second information relating to the capabilities of the called facsimile to the calling facsimile;

a fourth step of comparing by the calling facsimile, when the calling facsimile receives the second control signal, the second information relating to the capabilities of the called facsimile and the first information relating to the capabilities of the called facsimile which is stored in the storage means updating the first information stored in the storage means, and sending out to the called facsimile a third control signal composed of a tone signal indicating that a facsimile message will be sent to the called facsimile when the capabilities of the called facsimile have been changed; and a fifth step of determining a transmission mode on the basis of the first information relating to the capabilities of the called facsimile sending out the third control signal, and then sending out a facsimile message to the called facsimile.

2. The transmitting method according to claim 1, wherein the first information and the second information relating to the capabilities of the called facsimile respectively include information representing the size of paper on which printing can be done and information representing resolution.

3. The transmitting method according to claim 1, wherein the second control signal is a tone signal that represents the capabilities of the called facsimile by frequency.

4. The transmitting method according to claim 2, wherein the second control signal is a tone signal that represents the capabilities of the called facsimile by frequency.

5. The transmitting method according to claim 1, wherein in sending out the facsimile message to the called facsimile, information representing resolution of the facsimile message to be actually transmitted and information representing a size of paper on which the facsimile message should be printed are also sent out.

6. The transmitting method according to claim 2, wherein in sending out the facsimile message to the called facsimile, information representing the resolution of the facsimile message to be actually transmitted and information representing the size of paper on which the facsimile message should be printed are also sent out.

7. The transmitting method according to claim 3, wherein in sending out the facsimile message to the called facsimile, information representing resolution of the facsimile message to be actually transmitted and information representing a size of paper on which the facsimile message should be printed are also sent out.

8. The transmitting method according to claim 4, wherein in sending out the facsimile message to the called facsimile, information representing the resolution of the facsimile message to be actually transmitted and information representing the size of paper on which the facsimile message should be printed are also sent out.

* * * * *